United States Patent
Shin

(10) Patent No.: US 7,644,897 B2
(45) Date of Patent: Jan. 12, 2010

(54) DISPLAY APPARATUS

(75) Inventor: Jong-hwa Shin, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 11/468,374

(22) Filed: Aug. 30, 2006

(65) Prior Publication Data

US 2007/0045488 A1 Mar. 1, 2007

(30) Foreign Application Priority Data

Aug. 31, 2005 (KR) .................. 10-2005-0080876

(51) Int. Cl.
*A47G 23/02* (2006.01)
(52) U.S. Cl. .................. 248/176.1; 248/917; 248/919; 248/923
(58) Field of Classification Search .............. 248/279.1, 248/917–923, 276.1, 278.1, 146
See application file for complete search history.

(56) References Cited

U.S. PATENT DOCUMENTS

| | | | |
|---|---|---|---|
| 6,064,373 A | 5/2000 | Ditzik | |
| 7,014,154 B2 * | 3/2006 | Jeong et al. | 248/157 |
| 7,213,792 B2 * | 5/2007 | Choi | 248/279.1 |
| 7,369,672 B2 * | 5/2008 | Hirschhorn | 381/333 |
| 2004/0011932 A1 * | 1/2004 | Duff | 248/157 |
| 2004/0113031 A1 * | 6/2004 | Sung | 248/146 |
| 2005/0041379 A1 * | 2/2005 | Jang | 361/681 |
| 2005/0045782 A1 * | 3/2005 | Lee et al. | 248/158 |
| 2006/0016942 A1 * | 1/2006 | Lo | 248/131 |
| 2006/0038092 A1 * | 2/2006 | Choi | 248/121 |
| 2006/0231697 A1 * | 10/2006 | Hsu | 248/125.9 |
| 2007/0102600 A1 * | 5/2007 | Ishizaki et al. | 248/176.3 |

FOREIGN PATENT DOCUMENTS

| | | |
|---|---|---|
| CN | 1414782 | 4/2003 |
| JP | 2003298248 | 10/2003 |
| KR | 1999-30753 | 7/1999 |
| KR | 2004-96097 | 11/2004 |

OTHER PUBLICATIONS

Chinese Office Action dated Nov. 7, 2008 issued in CN 200610128824.2.

* cited by examiner

*Primary Examiner*—Amy J Sterling
(74) *Attorney, Agent, or Firm*—Stanzione & Kim LLP

(57) ABSTRACT

A display apparatus includes a display main body to display an image, a base, a lifting unit having a guide frame extending from the base, a lifting member coupled to the display main body and movably coupled to the guide frame to lift the display main body along the guide frame, and a lifting spring member provided between the guide frame and the lifting member to bias the lifting member away from the base, and a locking unit to couple the guide frame and the lifting member to be detachable to each other and to lock the display main body in a predetermined position with respect to the base. Accordingly, the display apparatus is capable of lifting the display main body more safely and locking the display main body in the predetermined position. The display apparatus also has an aesthetic appearance, and the display main body may be rotated in various directions with respect to the base.

20 Claims, 9 Drawing Sheets

DISPLAY APPARATUS

CROSS-REFERENCE TO RELATED APPLICATIONS

This application claims the benefit of Korean Patent Application No. 2005-0080876, filed on Aug. 31, 2005, in the Korean Intellectual Property Office, which is hereby incorporated in its entirety by reference for all purposes as if fully set forth herein.

BACKGROUND OF THE INVENTION

1. Field of the Invention

The general inventive concept relates to a display apparatus, and more particularly, to a display apparatus having improved lifting and rotating operations for a display main body.

2. Description of the Related Art

Generally, a display apparatus includes a display main body on which an image is formed, and a stand which is positioned on an installation surface, such as a table to support the display main body.

A display panel of a thin plate type, such as a liquid crystal display (LCD) or a plasma display panel (PDP), is widely used as the display main body. Recently, a stand which is capable of varying a height of the display main body has been developed.

A conventional display apparatus having the stand capable of varying the height is described in U.S. Pat. No. 6,064,373. The conventional display apparatus includes a flat plate type display panel, a base unit, a pillar member vertically installed on the base unit, a lifting member having a lower part inserted into the pillar member and an upper part supporting the display panel. According to this configuration, the lifting member is inserted into the pillar member in a telescopic manner to adjust the height of the display panel in the conventional display apparatus.

Although the conventional display apparatus may adjust the height of the display main body, it is difficult to support the display main body safely and securely due to an increase in size of the display main bodies being developed. In addition, there is a problem in that the display main body of the conventional display apparatus may be lifted and/or moved with respect to the base unit while the conventional display apparatus is packed or carried.

SUMMARY OF THE INVENTION

Accordingly, the present general inventive concept provides a display apparatus that is capable of lifting the display main body more safely and locking the display main body in a predetermined position.

The present general inventive concept also provides a display apparatus which has an aesthetic appearance and having a display main body which can rotate in various directions with respect to a base.

Additional aspects and features of the general inventive concept will be set forth in part in the description which follows, and in part will be obvious from the description, or may be learned by practice of the general inventive concept.

The foregoing and/or other aspects of the present general inventive concept can be achieved by providing a display apparatus, comprising a display main body to display an image, a base, a lifting unit having a guide frame extending from the base, a lifting member coupled to the display main body and movably coupled with respect to the guide frame to lift the display main body along the guide frame, and a lifting spring member provided between the guide frame and the lifting member to bias the lifting member away from the base, and a locking unit to couple the guide frame and the lifting member to be detachable to each other and to lock the display main body in a predetermined position with respect to the base.

The locking unit may comprise a locking member provided in the guide frame and detachably coupled with the lifting member, and a button member provided in the locking member to release a coupling between the locking member and the lifting member.

The locking unit may further comprise an elastic member to elastically bias the locking member to maintain the coupling between the locking member and the lifting member.

The lifting spring member may comprise a first side coupled to the lifting member and a second side having a spiral spring shape being supported by a lifting spring supporter provided in the guide frame such that the first side is movable with respect to the second side according to a position of the lifting member.

The lifting unit may further comprise a guide rail provided between the lifting member and the guide frame to slidably move the lifting member with respect to the guide frame.

The guide rail may comprise a fixed rail coupled to the guide frame and a slider movably coupled to the fixed rail to support the lifting member to move upward and downward.

The guide frame may comprise a rail supporter to support the guide rail and a curved stand disposed between the rail supporter and the base.

The display apparatus may further comprise a swiveling unit provided between the base and the lifting unit to rotate the display main body around a vertical axis with respect to the base.

The swiveling unit may comprise a swivel member coupled to the guide frame to rotate together with the guide frame, and a swivel support which is provided on the base to accommodate and rotatably support the swivel member.

The swiveling unit may further comprise a swivel shaft provided on the swivel support to pass through a center of the swivel member, and a bent part extending outwardly from an end of the swivel shaft to contact the swivel member to create a predetermined friction force therewith.

The display apparatus may further comprise a tilting unit provided between the display main body and the lifting unit to rotate the display main body around a horizontal axis which is parallel with a planar surface of the display main body.

The tilting unit may comprise a first tilting bracket coupled to the lifting member, a second tilting bracket coupled to the display main body, a tilting shaft coupled to the first tilting bracket and the second tilting bracket; and a tilting spring member provided between the first tilting bracket and the second tilting bracket to elastically bias the second tilting bracket with respect to the first tilting bracket.

The display apparatus may further comprise a pivoting unit provided between the display main body and the tilting unit to rotate the display main body around a horizontal axis which is perpendicular to a planar surface of the display main body.

The pivoting unit may comprise a pivoting bracket coupled to the display main body, and a pivoting shaft coupled to the pivoting bracket and the second tilting bracket to rotate the pivoting bracket around the horizontal axis which is perpendicular to the planar surface of the display main body with respect to the second tilting bracket.

The foregoing and/or other aspects of the present general inventive concept can also be achieved by providing a display apparatus, comprising a display main body, a guide frame having an elongated shape extending vertically from the display main body, and a base attached to the guide frame to support the guide frame and the display main body on an installation surface and having a swivel unit disposed in the base to which the guide frame is connected such that the guide frame and the display main body are swivelable about a vertical axis with respect to the base.

The foregoing and/or other aspects of the present general inventive concept can also be achieved by providing a display apparatus, comprising a display main body having a lifting member extending from a rear side thereof, a guide frame having an elongated shape extending vertically along a rear side of the display main body and a seating part disposed at an upper portion thereof and being coupled to the lifting member of the display main body, a base attached to the guide frame to support the guide frame and the display main body on an installation surface, and a lifting spring member having a spiral spring end disposed on the seating part of the guide frame and an extension end extending downward to be coupled to the lifting member of the display main body such that the extension end is movable with respect to the spiral spring end to counteract a force of gravity on the display main body.

The foregoing and/or other aspects of the present general inventive concept can also be achieved by providing a display apparatus, comprising a display main body having a lifting member disposed at a rear side thereof, a guide frame having an elongated shape extending vertically from the display main body, the guide frame having a guide rail and a slider which is slidably coupled to the guide rail and the lifting member such that the display main body is vertically movable along the guide frame, and a base attached to the guide frame to support the guide frame and the display main body on an installation surface.

The foregoing and/or other aspects of the present general inventive concept can also be achieved by providing a display apparatus, including a display main body, a frame having an elongated shape extending vertically from the display main body, a base attached to the frame to support the frame and the display main body on an installation surface, a tilting unit disposed between the frame and the display main body to tilt the display main body with respect to the base about a first horizontal axis parallel to a major plane of the display main body, and a pivoting unit disposed between the tilting unit and the display main body to pivot the display main body with respect to the base about a second horizontal axis perpendicular the major plane of the display main body.

The foregoing and/or other aspects of the present general inventive concept can also be achieved by providing a supporting apparatus having a base to support a display main body to display an image, the apparatus comprising a lifting unit having a guide frame extending from the base, a lifting member coupled to the display main body and movably coupled to the guide frame to lift the display main body along the guide frame, and a lifting spring member provided between the guide frame and the lifting member to bias the lifting member away from the base, and a locking unit to couple the guide frame and the lifting member to be detachable to each other and to lock the display main body in a predetermined position with respect to the base.

It is to be understood that both the foregoing general description and the following detailed description are exemplary and explanatory and are intended to provide further explanation of the general inventive concept as claimed.

BRIEF DESCRIPTION OF THE DRAWINGS

These and/or other aspects of the present general inventive concept will become apparent and more readily appreciated from the following description of the exemplary embodiments, taken in conjunction with the accompany drawings, in which.

DETAILED DESCRIPTION OF THE PREFERRED EMBODIMENTS

Figure 1:
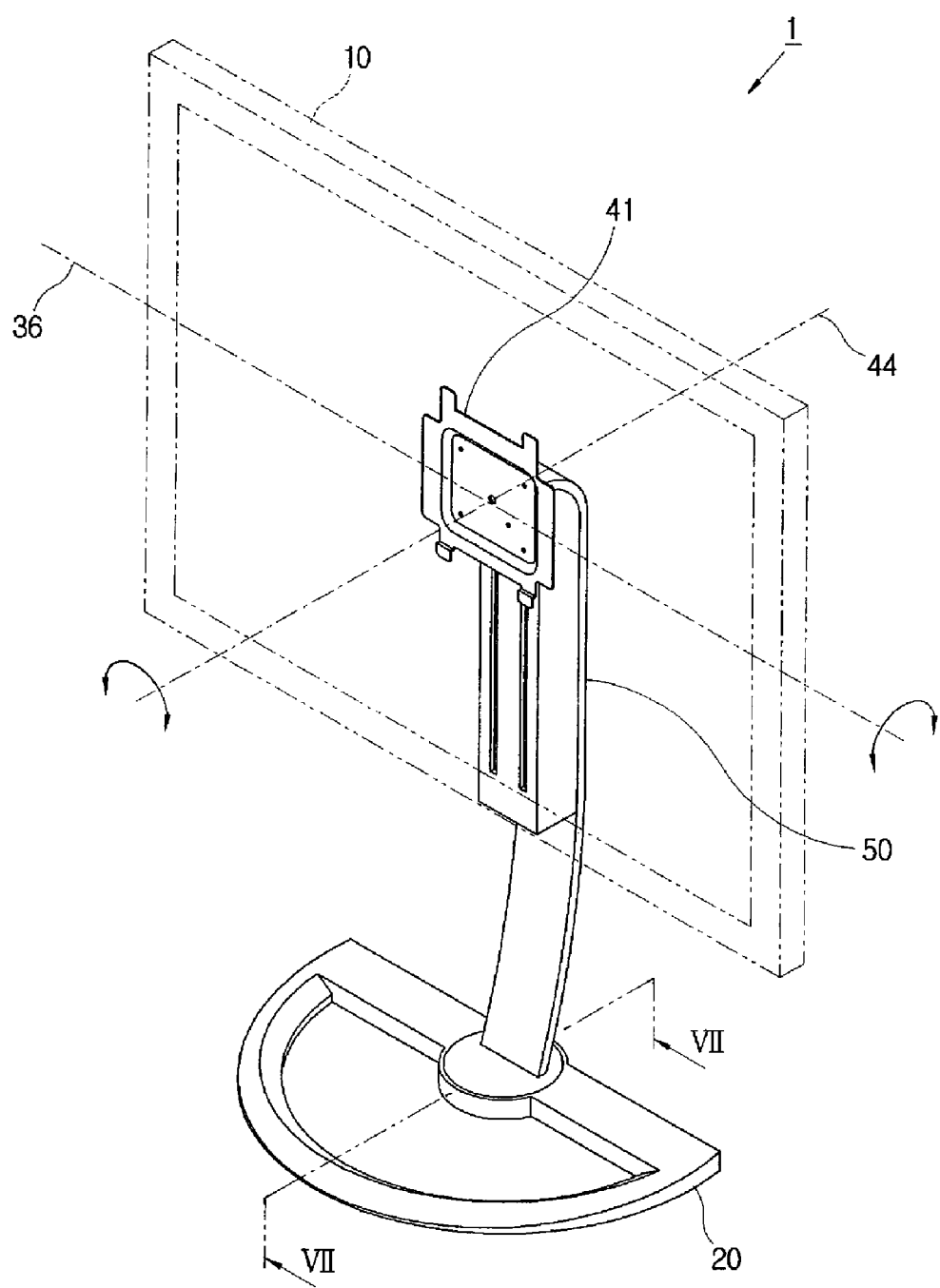
FIG. 1 is a perspective view illustrating a display apparatus according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below so as to explain the present general inventive concept by referring to the figures.

As illustrated in FIGS. 1 through 7, a display apparatus 1 according to an embodiment of the present general inventive concept may comprise a display main body 10 to display an image, a base 20 positioned on an installation surface such as a table, a lifting unit 50 provided between the display main body 10 and the base 20 so that the display main body 10 can be lifted (i.e., moved vertically) in a vertical direction with respect to the base 20, and a locking unit 80 (see FIG. 5) coupled with the lifting unit 50 to prevent the display main body 10 from lifting by locking the display main body 10 in a predetermined position. The display apparatus 1 may further comprise a tilting unit 30 (see FIG. 3) provided between the display main body 10 and the lifting unit 50 to tilt the display main body 10 with respect to the base 20, and a pivoting unit 40 (see FIG. 3) provided between the display main body 10 and the tilting unit 30 to pivot the display main body 10 with respect to the base 20. The display apparatus 1 may further comprise a swiveling unit 90 (see FIG. 6) coupled with respect to the base 20 to swivel the display main body 10 with respect to the base 20.

Figure 2:
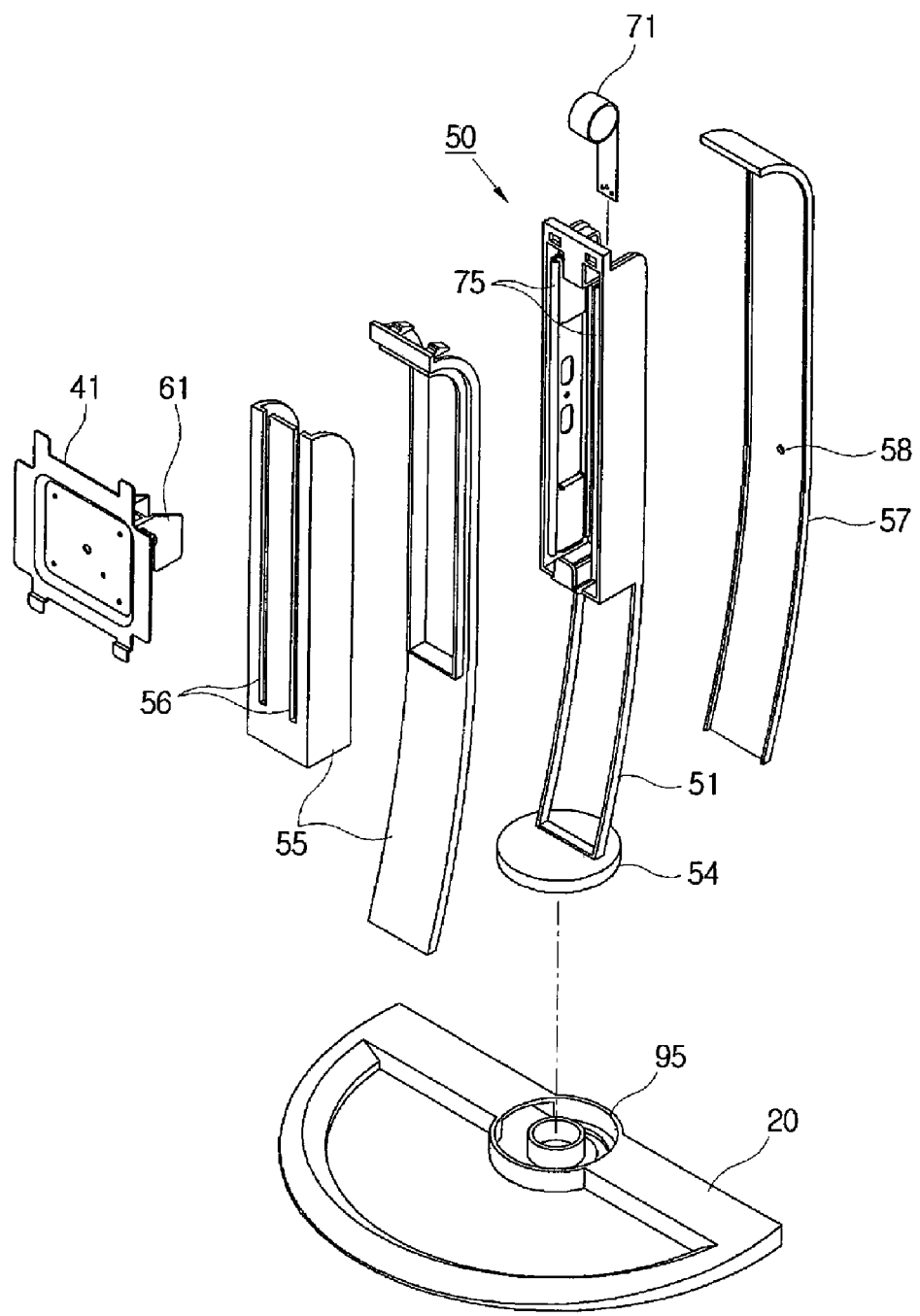
FIG. 2 is an exploded perspective view illustrating the display apparatus of FIG. 1.
Figure 3:
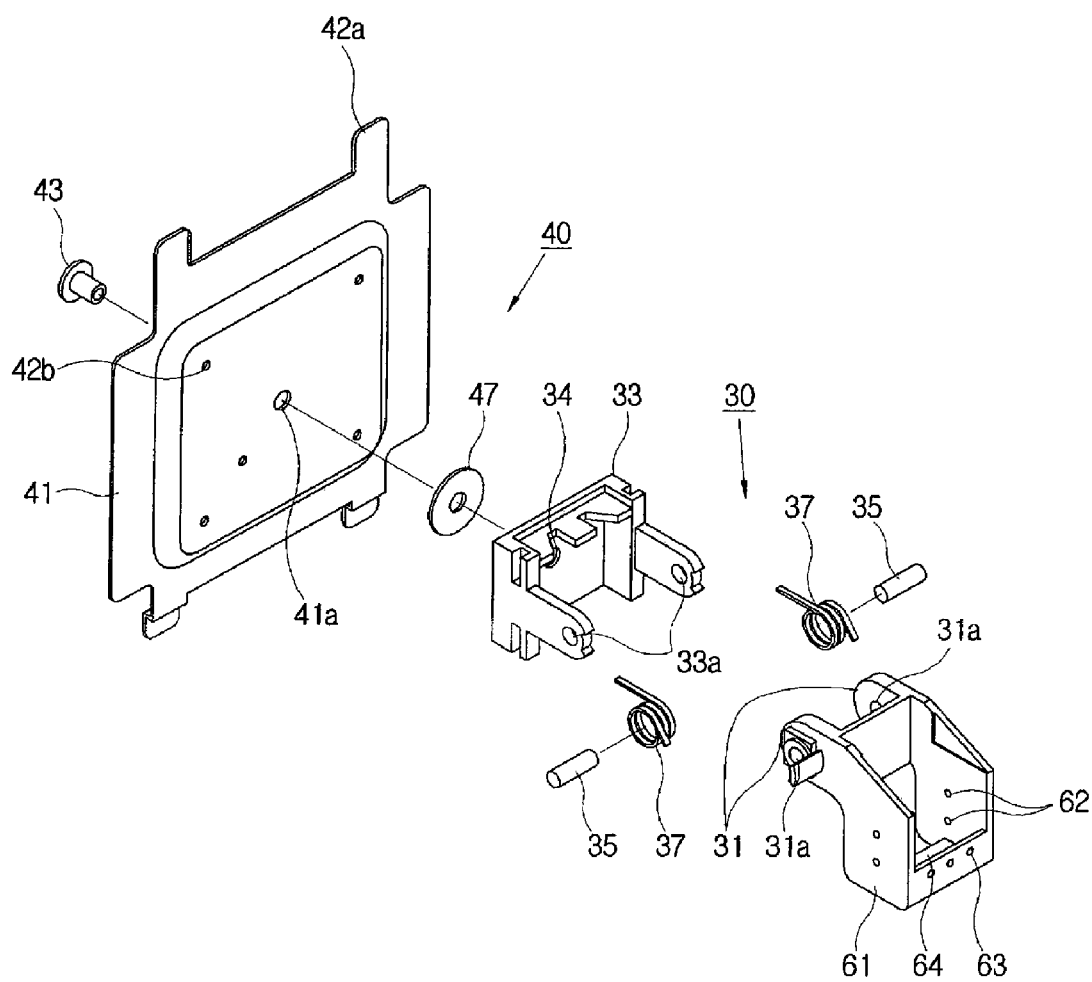
FIG. 3 is an exploded perspective view illustrating a tilting unit and a pivoting unit of the display apparatus of FIG. 1, according to an embodiment of the present general inventive concept.

As illustrated in FIG. 1, the display main body 10 may be provided as a display panel of a thin plate type such as an LCD or a PDP to display the image. Referring to FIGS. 1 to 3, a plurality of connecting holes (not illustrated) may be provided on a rear of the display main body 10 coupled with stopping protrusions 42a and coupling holes 42b of a pivoting bracket 41 (to be described later) by a screw(s) (not illustrated), or the like. The coupling holes 42b of the pivoting bracket 41 and the connecting holes of the display main body 10 may be formed according to the Video Electronic Standard Association (VESA) standard. Hence, different kinds of arm stands (not illustrated) provided according to the VESA standard may be installed into the connecting holes of the display main body 10.

Figure 6:
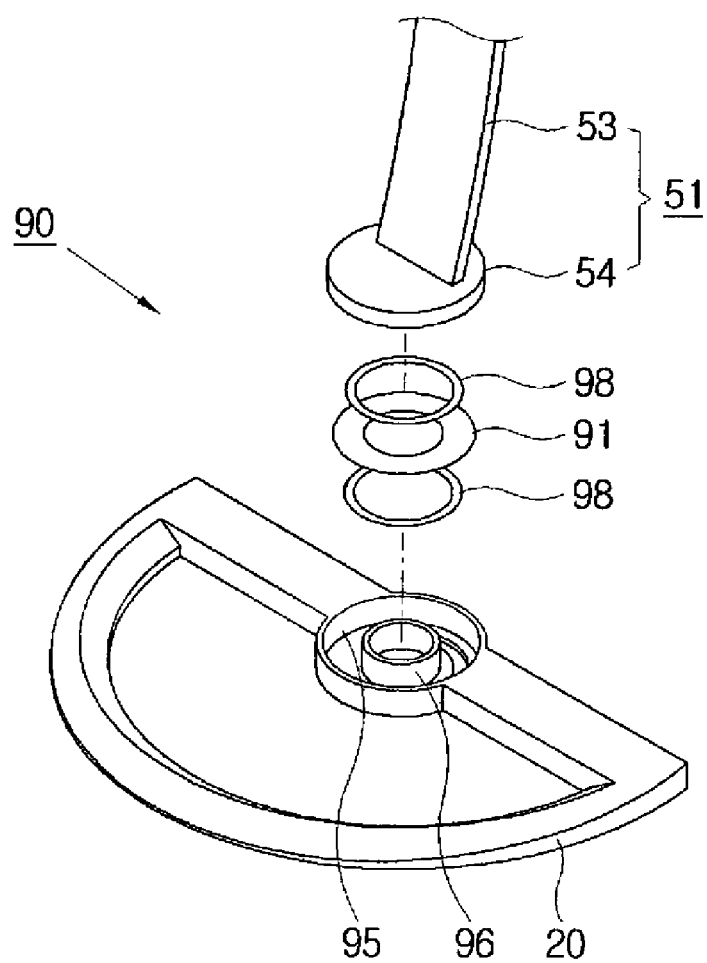
FIGS. 6 and 7 are an exploded perspective view and a sectional view, respectively, illustrating a swiveling unit of the display apparatus of FIG. 1, according to an embodiment of the present general inventive concept.

The base 20 is provided on the installation surface, such as a table. As illustrated in FIGS. 2 and 6, a swivel support 95 of the swiveling unit 90 is provided on the base 20 and is rotatably coupled to a guide frame 51 of the lifting unit 50.

As illustrated in FIGS. 1 through 3, the tilting unit 30 is provided between the lifting unit 50 and the pivoting unit 40 to tilt the display main body 10 around an axis 36 with respect to the lifting unit 50. The axis 36 extends horizontally in a major plane of the display main body 10. The tilting unit 30 may comprise a first tilting bracket 31 coupled with the lifting unit 50, a second tilting bracket 33 coupled with the display main body 10, and a tilting shaft 35 coupled to the first tilting bracket 31 and the second tilting bracket 33 to tilt the second tilting bracket 33 with respect to the first tilting bracket 31. The tilting unit 30 further comprises a tilting spring member 37 coupled between the first tilting bracket 31 and the second tilting bracket 33.

The first tilting bracket 31 is coupled to a lifting member 61 of the lifting unit 50 and slides together with the lifting member 61. A first pivoting shaft coupling part 34 is formed in the second tilting bracket 33 to be coupled with a pivoting shaft 43 of the pivoting unit 40.

The tilting shaft 35 is inserted into a first tilting shaft coupling part 31a of the first tilting bracket 31 and a second tilting shaft coupling part 33a of the second tilting bracket 33 to tilt the second tilting bracket 33 with respect to the first tilting bracket 31. The tilting shaft 35 may be press-fitted with the first tilting shaft coupling part 31a and the second tilting shaft coupling part 33a to provide a tilting friction force when the second tilting bracket 33 tilts with respect to the first tilting bracket 31. The tilting friction force is such that the user can easily overcome this force.

The tilting spring member 37 may be provided as a torsion coil spring having a first side coupled to the first tilting bracket 31 and a second side of the tilting spring member 37 coupled to the second tilting bracket 33. The tilting spring member 37 is arranged so that an upper region of the second tilting bracket 33 can be elastically biased with respect to the first tilting bracket 31 in a forward tilting direction (i.e., such that a lower portion of the display main body 10 is pushed forward). The tilting spring member 37 may have an elastic force that can prevent the second tilting bracket 33 coupled with respect to the display main body 10 from tilting backward (i.e., such that the lower portion of the display main body is tilted backward) due to the weight of the display main body 10. Thus, a user can regulate the display main body 10 to tilt with little influence due to the weight of the display main body 10 using the elastic force of the tilting spring member 37. Also, a user can tilt the display main body 10 in forward and backward directions conveniently by applying a similar pressure.

As illustrated in FIGS. 1 through 3, the pivoting unit 40 is provided between the display main body 10 and the tilting unit 30 to pivot the display main body 10 with respect to the base 20 around an axis 44. The axis 44 extends horizontally perpendicular to the plane of the display main body 10. The pivoting unit 40 comprises the pivoting shaft 43 coupled with the tilting unit 30 and the pivoting bracket 41. The pivoting bracket 41 has a first side coupled to the display main body 10 and a second side rotatably coupled to the pivoting shaft 43.

The pivoting bracket 41 is provided as a plate type. A second pivoting shaft coupling part 41a is formed in a center region of the pivoting bracket 41. The plurality of stopping protrusions 42a and the coupling holes 42b are provided in the pivoting bracket 41 to couple the pivoting bracket 41 to a rear of the display main body 10.

The pivoting shaft 43 is coupled to the first pivoting shaft coupling part 34 of the second tilting bracket 33 and is rotatably coupled to the second pivoting shaft coupling part 41a of the pivoting bracket 41. In other words, a first side of the pivoting shaft 43 is inserted into the first pivoting shaft coupling part 34 of the second tilting bracket 33, and a second side of the pivoting shaft 43 is inserted into the second pivoting shaft coupling part 41a of the pivoting bracket 41. The first side of the pivoting shaft 43 has a diameter that is larger than that of a center region of the pivoting shaft 43. The second side of the pivoting shaft 43 penetrates the second pivoting shaft coupling part 41a, and then the second side of the pivoting shaft 43 is bent outward of the second pivoting shaft coupling part 41a, to pressurize the pivoting bracket 41. The pivoting unit 40 may further comprise a pivoting washer 47 coupled with the pivoting shaft 43 between the second tilting bracket 33 and the pivoting bracket 41 to provide a suitable pivoting friction force. Accordingly, the pivoting bracket 41 may pivot with respect to the pivoting shaft 43 with a predetermined friction force with respect to the second tilting bracket 33. The pivoting friction force is such that a user can easily overcome this force.

Figure 4:
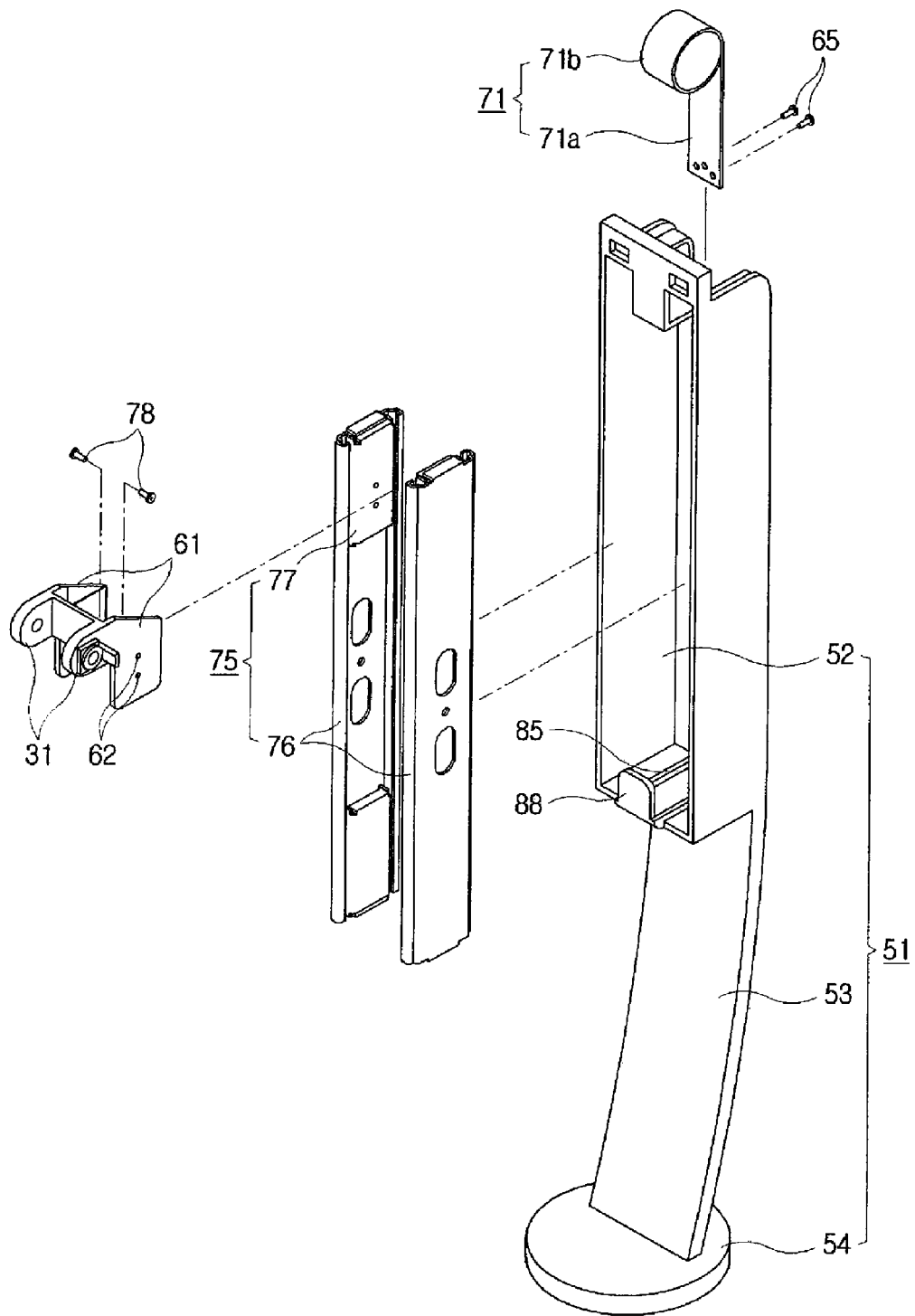
FIGS. 4 and 5 are exploded perspective views illustrating a lifting unit and a locking unit of the display apparatus of FIG. 1, respectively, according to an embodiment of the present general inventive concept.
Figure 5:
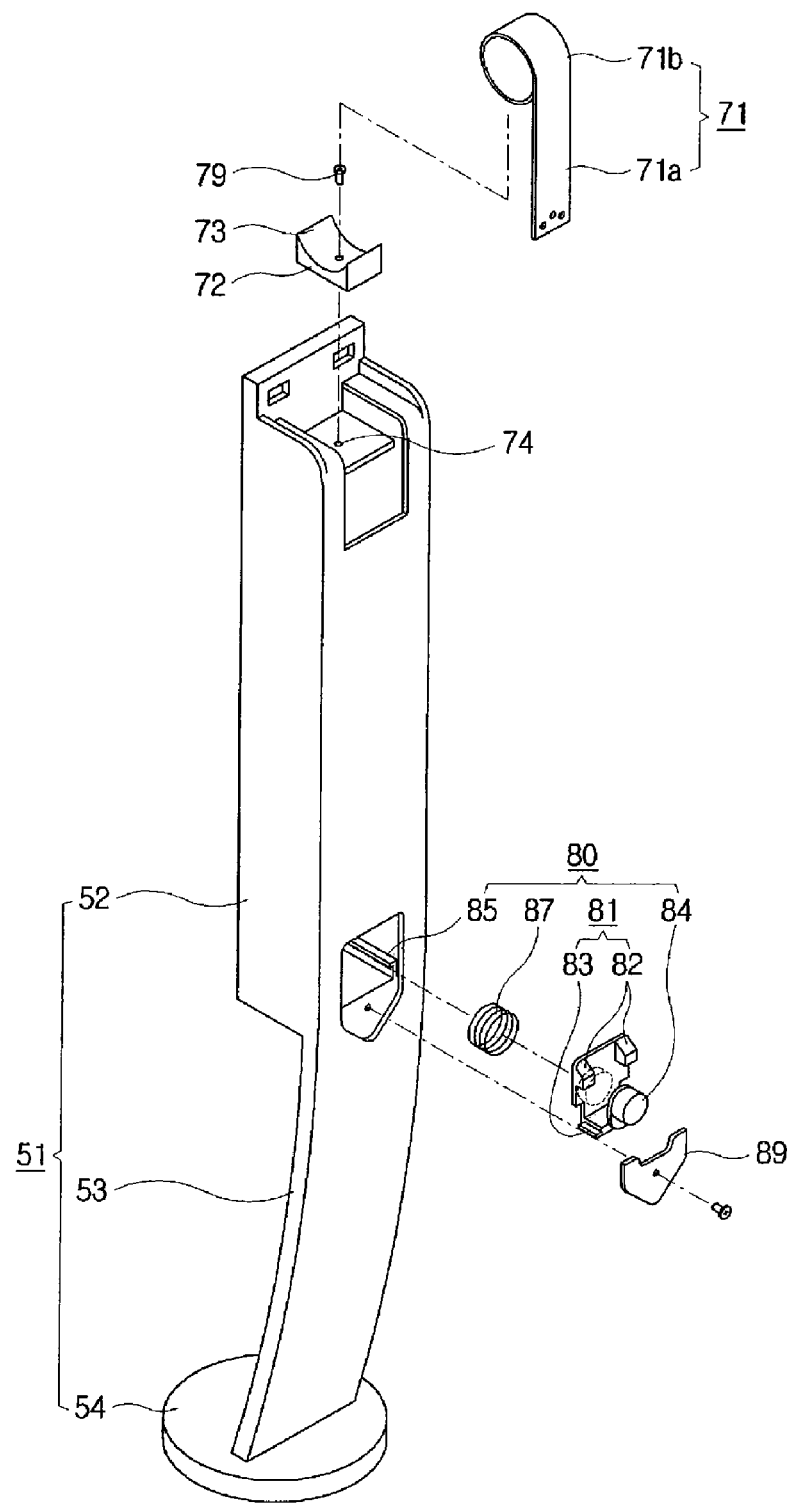

As illustrated in FIGS. 3 through 5, the lifting unit 50 (see FIG. 1) is provided between the base 20 and the tilting unit 30 to move the display main body 10 in upward and downward directions with respect to the base 20. The lifting unit 50 comprises a guide frame 51 vertically installed on the base 20, a lifting member 61 that is coupled to the display main body 10 to lift the display main body 10 with respect to the guide frame 51. The lifting member 61 is movably coupled to the guide frame 51, and a lifting spring member 71 is provided between the guide frame 51 and the lifting member 61 to elastically move the lifting member 61 upward. The lifting unit 50 may further comprise a guide rail 75 provided between the lifting member 61 and the guide frame 51 to slidably move with respect to the guide frame 51.

The guide rail 75 comprises a fixed rail 76 coupled to the guide frame 51, and a slider 77 coupled to the lifting member 61 and movably coupled to the fixed rail 76 to support the lifting member 61 so that the lifting member 61 can move upward and downward. The guide rail 75 is provided in a pair (i.e., a pair of rails) and is arranged in the guide frame 51 to be spaced apart form each other. According to the present embodiment, the fixed rail 76 and the slider 77 are coupled to the guide frame 51 and the lifting member 61 by a fastener such as a screw 78, respectively. However, the fixed rail 76 and the slider 77 may be coupled by various methods, such as welding and hook-coupling and the like.

The guide frame 51 comprises a rail supporter 52 to support the guide rail 75 and a curved stand 53 provided between the rail supporter 52 and the base 20. A swivel member coupling part 54 is provided on the guide frame 51 to be coupled to a swivel member 91 (see FIG. 6) of the swiveling unit 90 (see FIG. 6).

Referring to FIG. 2, a front guide cover 55 formed with a lifting member guide slot 56 to allow the lifting member 61 to pass therethrough is provided in front of the guide frame 51. A rear guide cover 57 formed with a button through part 58 to accommodate a button 84 (see FIG. 5) of the locking unit 80 (see FIG. 5) therethrough is provided at a rear of the guide frame 51.

Referring to FIGS. 2 through 5, the rail supporter 52 has a cross section of a "U" shape to support the guide rail 75 at opposite sides thereof. The rail supporter 52 may comprise a metal material to maintain a predetermined strength. Alternatively, the rail supporter 52 may be made of different materials, such as plastics and the like.

The curved stand 53 is provided between the rail supporter 52 and the swivel member coupling part 54. As illustrated in FIG. 1, the curved stand 53 is curved along an upward direction, thereby providing the display apparatus 1 with aesthetic characteristics.

As illustrated in FIGS. 3 and 4, the lifting member 61 comprises a rail coupling part 62 coupled to the slider 77 of the guide rail 75 to move together with the slider 77 and a lifting spring coupling part 63 coupled to a first side 71a of the lifting spring member 71. The tilting bracket 31 of the tilting unit 30 and the lifting member 61 may be provided as one body so that the lifting member 61 can be moved together with the tilting bracket 31. Also, the lifting member 61 comprises an engaging part 64 to be engaged with the locking member 81 of the locking unit 80 (see FIG. 5).

The rail coupling part 62 is provided on opposite sides of the lifting member 61 corresponding to the pair of guide rails 75, and the rail coupling part 62 is coupled to the slider 77 by the screw(s) 78.

As illustrated in FIG. 3, the lifting spring coupling part 63 is provided at a rear part of the lifting member 61 to be coupled to the first side 71a of the lifting spring member 71 by a screw(s) 65.

As illustrated in FIG. 3, the engaging part 64 protrudes in front of the lifting spring coupling part 63 to be detachably coupled to a locking part 82 (see FIG. 5) of the locking member 81 (see FIG. 5).

As illustrated in FIGS. 4 and 5, the lifting spring member 71 is provided as a spiral spring type and is coupled with the guide frame 51 and the lifting member 61. The first side 71a of the lifting spring member 71 is coupled to the lifting member 61, and a second side 71b of the lifting spring member 71 is supported by the lifting spring supporting part 72 provided in the guide frame 51. In other words, the second side 71bof the lifting spring member 71 is wound in a roll shape and is supported by the lifting spring supporting part 72. The first side 71aof the lifting spring member 71 extends from the second side 71band is coupled to the lifting spring coupling part 63 of the lifting member 61. The lifting spring member 71 may provide an elastic force that counteracts the weight of the display main body 10, thereby preventing the display main body 10 from moving downward due to the force of gravity. Accordingly, a user can easily move the display main body 10 upward and downward with a relatively small pressure to overcome a friction force of the guide rail 75. The front side 71a of the lifting spring member 71 may be moved with respect to the second side 71baccording to movement of the lifting member 61 by unwinding and winding of the lifting spring member 71. The lifting spring member 71 is not limited to the spiral spring type, and may comprise different elastic bodies such as a coil spring, a plate spring, rubber, etc.

As illustrated in FIG. 5, the lifting spring supporter 72 is formed with a spring seating part 73 having a circular arc shape corresponding to the shape of the second side 71bof the lifting spring member 71 to support the lifting spring member 71 thereon. The lifting spring supporter 72 is coupled to a frame coupling part 74 provided in the guide frame 51 by a fastener, such as a screw 79.

As illustrated in FIGS. 3 to 5, the locking unit 80 is provided in the lifting unit 50 to prevent the display main body 10 from lifting and to detachably couple the guide frame 51 and the lifting unit 61 to each other. In other words, the locking unit 80 locks the display main body 10 in a predetermined position with respect to the lifting unit 50. The predetermined position may be a lowermost position of the display main body 10 with respect to the base 20. The locking unit 80 comprises the locking member 81 provided in the guide frame 51 to be detachably coupled with the lifting unit 61 and the button 84 provided in the locking member 81 to release a coupling between the locking member 81 and the lifting unit 61. The locking unit 80 may further comprise an elastic member 87 to elastically bias the locking member 81 to maintain the coupling between the locking member 81 and the lifting unit 61.

The locking member 81 is engaged with the lifting unit 61 when the lifting unit 61 moves downward along the guide frame 51. The locking member 81 comprises the locking part 82 engaged with the engaging part 64 of the lifting unit 61 and a protrusion part 83 movably coupled to a protrusion guide part 85 provided in the guide frame 51 (see FIG. 4). A locking member detaching prevention part 89 coupled to the guide frame 51 may prevent the locking member 81 from detaching from the protrusion guide part 85.

The protrusion part 83 is formed at opposite sides of the locking member 81 and is movably coupled to the protrusion guide part 85 so that the locking member 81 can move along the protrusion guide part 85 provided between side walls of the rail supporter 52.

The locking part 82 moves together with the locking member 81 along the protrusion guide part 85, and is engaged with the engaging part 64 of the lifting member 61 to prevent the lifting member 61 from being moved upward by the lifting spring member 71. That is, the locking part 82 engages the engaging part 64 when the lifting member 61 is moved downward along the guide frame 51 to the locking unit 80. The locking unit 80 may lock the lifting member 61 (and the display main body 10) in the lowermost position.

Referring to FIGS. 2 to 5, the button 84 protrudes backward from the locking member 81 to release the engagement of the locking part 82 and the engaging part 64. The button 84 is exposed outside through the button through part 58 of the rear guide cover 57 so that a user can directly press the button 84. Hence, a user presses the button 84 to move the locking member 81, thereby releasing the engagement of the locking part 82 and the engaging part 64.

The elastic member 87 is provided between the locking member 81 and the guide frame 51 and elastically presses the locking member 81 to be engaged with the lifting member 61. The elastic member 87 is provided between the locking member 81 and an elastic member supporting part 88 (see FIG. 4) coupled to the guide frame 51 in front of the locking member 81 to press the locking member 81 in a rearward direction. Thus, when a user presses the button 84 with a force that is greater than an elastic force of the elastic member 87, the locking part 82 is detached from the engaging part 64, and the lifting member 61 can be moved upward along the guide frame 51.

Figure 7:
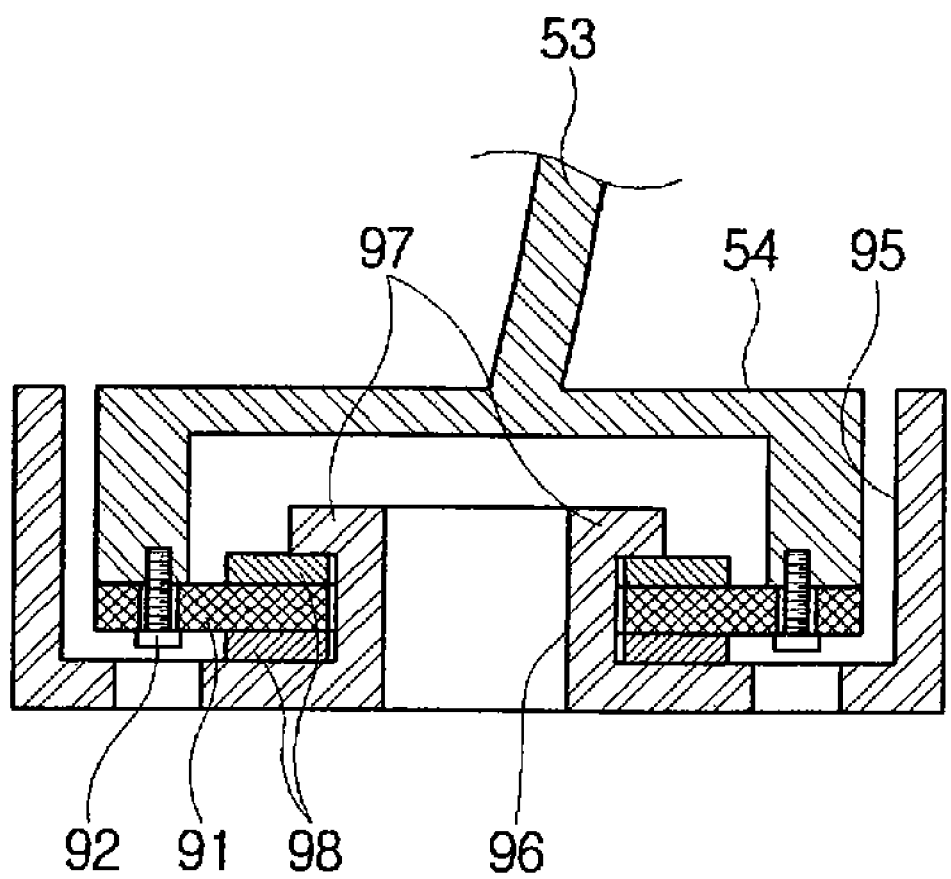

As illustrated in FIGS. 6 and 7, the swiveling unit 90 is provided between the base 20 and the lifting unit 50 to rotate the display main body 10 with respect to the base 20 around an axis in a lifting direction of the display main body 10 (i.e., in a vertical direction). The swiveling unit 90 comprises the swivel member 91 combined with the guide frame 51 and the swivel support 95 provided on the base 20 to accommodate and rotatably support the swivel member 91 therein. The swiveling unit 90 further comprises a swivel shaft 96 provided on the swivel support 95 to pass through the center of the swivel member 91 and a bent part 97 which is bent outwardly from an end part of the swivel shaft 96 and contacts the swivel member 91 to have a predetermined rotating friction force with respect to the swivel shaft 96.

The swivel member 91 is provided as a ring shape to allow the swivel shaft 96 to pass therethrough. The swivel member 91 is coupled to the swivel member coupling part 54 of the guide frame 51 to rotate together with the swivel member coupling part 54. The swivel member 91 is coupled with the swivel member coupling part 54 by a screw(s) 92. The screw 92 passes through a bottom side of the swivel support 95 and couples the swivel member coupling part 54 and the swivel member 91 together. However, the swivel member coupling part 54 and the swivel member 91 may be coupled together using a variety of structures or fasteners not necessarily limited to a screw.

The bent part 97 is outwardly bent from the swivel shaft 96 to contact the swivel member 91 at an upper end part thereof. A swivel washer 98 may be provided between the bent part 97 and the swivel member 91 to adequately adjust a rotating friction force of the swivel member 91. Hence, a user can overcome the rotating friction force to rotate the guide frame 51 with respect to the base 20.

With the structure and configuration described above, an operation of the display apparatus 1 according to embodiments of the present general inventive concept is described as follows.

As illustrated in FIG. 1, the display main body 10 may tilt around the axis 36 with respect to the lifting unit 50 and may pivot around the axis 44 with respect to the tilting unit 30.

Figure 8:
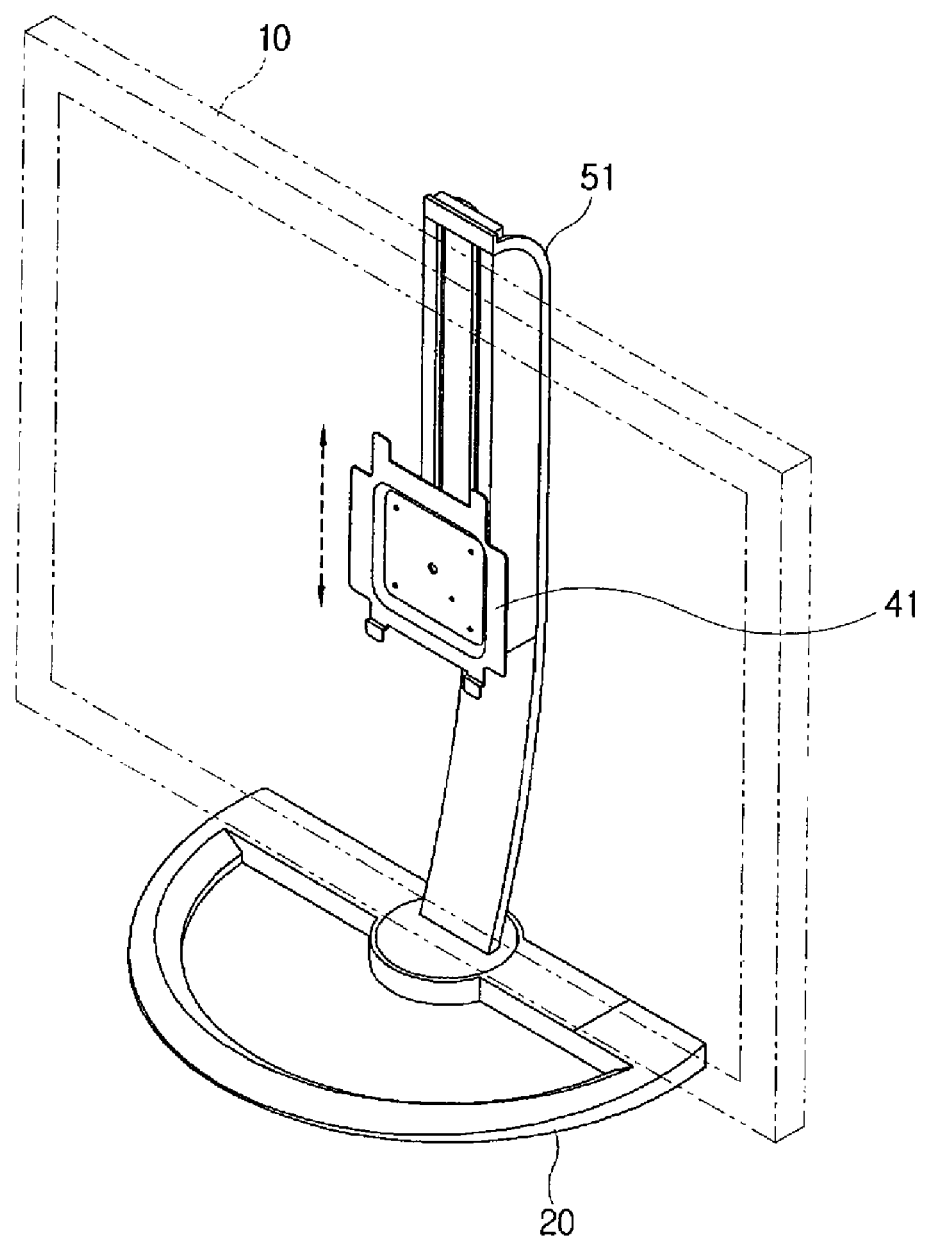
FIG. 8 is an operational perspective view illustrating a lifting unit of a display apparatus, according to an embodiment of the present general inventive concept.

Referring to FIGS. 3 through 7, a lifting operation (illustrated in FIG. 8) that lifts the display main body 10 with respect to the base 20 is described as follows. First, a user presses the display main body 10 in upward and downward directions so that the lifting member 61 coupled with the display main body 10 moves with respect to the guide frame 51, thereby moving the main body 10 upward and downward. In addition, a user can move the display main body 10 upward using the elastic force of the lifting spring member 71 without influence due to the weight of the display main body 10. Here, a user can move the display main body 10 upward and downward with a nearly similar small pressure. If the lifting member 61 is moved downward, the engaging part 64 of the lifting member 61 is automatically engaged with the locking part 82 of the locking member 81 by the elastic force of the elastic member 87. Then, a user presses the button 84 to detach the coupling between the locking part 82 and the engaging part 64.

Accordingly, the display main body 10 is moved downward and is then locked by the locking unit 80 so that a packing volume and a height of the display apparatus 1 can be decreased. In addition, the locking unit 80 can prevent the display main body 10 from being inclined and abruptly moving while the display apparatus 1 is moved or handled.

Figure 9:
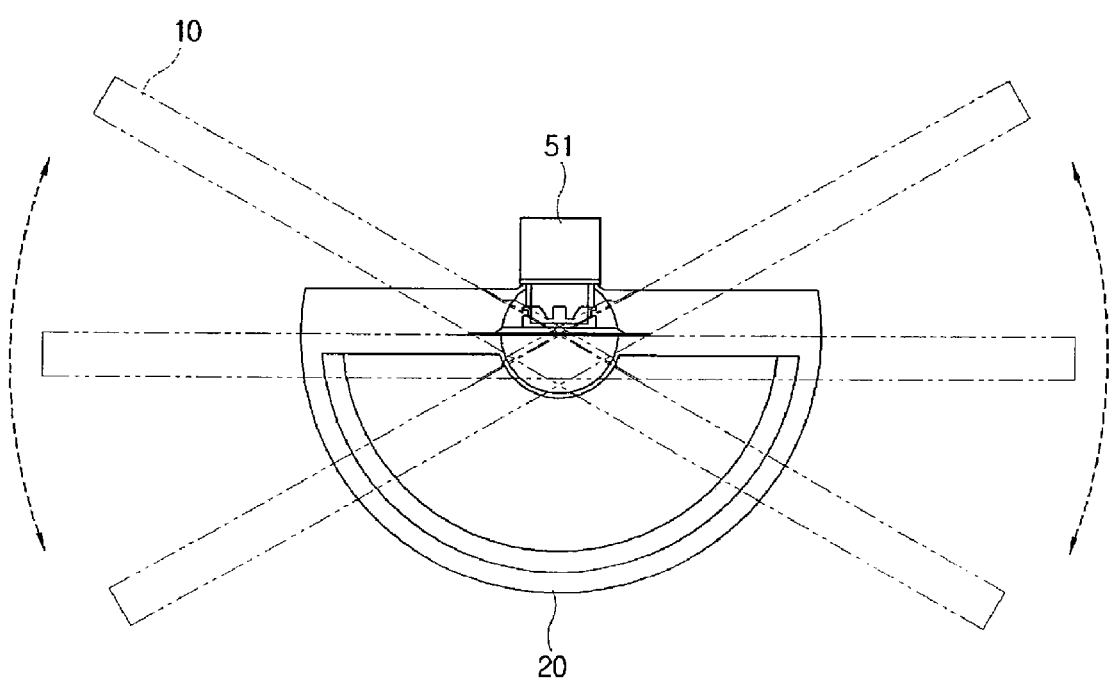
FIG. 9 is an operational perspective view illustrating a swiveling unit of the display apparatus of FIG. 1, according to an embodiment of the present general inventive concept.

Referring to FIGS. 2 through 7, a swiveling operation (illustrated in FIG. 9) that swivels the display main body 10 with respect to the installation surface is described as follows. First, a user presses the display main body 10 or the base 20 to rotate around a vertical axis such that the swivel member 91 coupled with the base 20 is swiveled around the vertical axis with respect to the swivel support 95 positioned on the installation surface. Accordingly, the display main body 10 is swiveled with respect to the base 20.

As described above, a display apparatus according to the embodiments of the present general inventive concept comprises a lifting unit to lift the display apparatus in upward and downward directions. Also, the display apparatus comprises a locking unit so that a display main body is easily moved and a packing volume and height may be decreased. In addition, the display apparatus comprises a tilting unit, a pivoting unit, and a swiveling unit so that the display main body may rotate with respect to the base in various directions.

As described above, the embodiments of the present general inventive concept provide a display apparatus that is capable of lifting a display main body more safely and locking the display main body in a predetermined position.

Also, the embodiments of the present general inventive concept provide a display apparatus which has an aesthetic appearance and having a display main body capable of rotating in various directions with respect to a base.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus, comprising:
    a display main body to display an image;
    a base;
    a lifting unit having a guide frame with guide slots and guide rails, the lifting unit extending from the base;
    a lifting member coupled to the display main body and movably coupled through the guide slots to the guide rails of the guide frame to lift the display main body along the guide rails, and a lifting spring member provided to bias the lifting member away from the base; and
    a locking unit to couple the guide frame and the lifting member to lock the display main body in a predetermined position with respect to the base, having:
        a button member provided on the guide frame to release a coupling between the locking unit and the lifting member; and
        an elastic member to elastically bias the locking unit to maintain the coupling between the locking member and the lifting member.

2. The display apparatus according to claim 1, the locking unit further comprises:
    a locking member detachably coupled with the lifting member.

3. The display apparatus according to claim 1, wherein the lifting spring member comprises a first side coupled to the lifting member and a second side having a spiral spring shape being supported by a lifting spring supporter provided in the guide frame such that the first side is movable with respect to the second side according to a position of the lifting member.

4. The display apparatus according to claim 1, wherein the lifting unit further comprises a guide rail provided between the lifting member and the guide frame to slidably move the lifting member with respect to the guide frame.

5. The display apparatus according to claim 4, wherein the guide rail comprises a fixed rail coupled to the guide frame and a slider movably coupled to the fixed rail to support the lifting member to move upward and downward.

6. The display apparatus according to claim 4, wherein the guide frame comprises a rail supporter to support the guide rail and a curved stand disposed between the rail supporter and the base.

7. The display apparatus according to claim 1, further comprising:
a swiveling unit provided between the base and the lifting unit to rotate the display main body around a vertical axis with respect to the base.

8. The display apparatus according to claim 7, wherein the swiveling unit comprises:
a swivel member coupled to the guide frame to rotate together with the guide frame; and
a swivel support which is provided on the base to accommodate and rotatably support the swivel member.

9. The display apparatus according to claim 8, wherein the swiveling unit further comprises:
a swivel shaft provided on the swivel support to pass through a center of the swivel member; and
a bent part extending outwardly from an end of the swivel shaft to contact the swivel member to create a predetermined friction force therewith.

10. The display apparatus according to claim 1, further comprising:
a tilting unit provided between the display main body and the lifting unit to rotate the display main body around a horizontal axis which is parallel with a planar surface of the display main body.

11. The display apparatus according to claim 10, wherein the tilting unit comprises:
a first tilting bracket coupled to the lifting member;
a second tilting bracket coupled to the display main body;
a tilting shaft coupled to the first tilting bracket and the second tilting bracket; and
a tilting spring member provided between the first tilting bracket and the second tilting bracket to elastically bias the second tilting bracket with respect to the first tilting bracket.

12. The display apparatus according to claim 11, further comprising:
a pivoting unit provided between the display main body and the tilting unit to rotate the display main body around a horizontal axis which is perpendicular to a planar surface of the display main body.

13. The display apparatus according to claim 12, wherein the pivoting unit comprises:
a pivoting bracket coupled to the display main body; and
a pivoting shaft coupled to the pivoting bracket and the second tilting bracket to rotate the pivoting bracket around the horizontal axis which is perpendicular to the planar surface of the display main body with respect to the second tilting bracket.

14. A display apparatus, comprising:
a display main body;
a guide frame having an elongated shape extending vertically from the display main body, the guide frame including guide slots and guide rails;
a lifting member coupled to the display main body and movably coupled through the guide slots to the guide rails of the guide frame to lift the display main body along the guide rails; and
a base attached to the guide frame to support the guide frame and the display main body on an installation surface and having a swivel unit disposed in the base to which the guide frame is connected such that the guide frame and the display main body are swivelable about a vertical axis with respect to the base, the swivel unit having:
a swivel member coupled to the guide frame to rotate together with the guide frame;
a swivel support which is provided on the base to accommodate and rotatably support the swivel member,
a swivel shaft provided on the swivel support to pass through a center of the swivel member; and
a bent part extending outwardly from an end of the swivel shaft to contact a swivel washer located between the swivel member and the bent part to create a predetermined friction force therewith.

15. A supporting apparatus having a base to support a display main body to display an image, the apparatus comprising:
a lifting unit having a guide frame with guide slots and guide rails, the lifting unit extending from the base;
a lifting member coupled to the display main body and movably coupled through the guide slots to the guide rails of the guide frame to lift the display main body along the guiderails, and a lifting spring member provided between the guide frame and the lifting member to bias the lifting member away from the base; and
a locking unit to couple the guide frame and the lifting member to be detachable to each other and to lock the display main body in a predetermined position with respect to the base, having:
a button member provided on the guide frame to release a coupling between the locking unit and the lifting member; and
an elastic member to elastically bias the locking unit to maintain the coupling between the locking unit and the lifting member.

16. The supporting apparatus according to claim 15, the locking unit further comprises:
a locking member detachably coupled with the lifting member.

17. The supporting apparatus according to claim 15, wherein;
the lifting unit further comprises a guide rail provided between the lifting member and the guide frame to slidably move the lifting member with respect to the guide frame; and
the guide frame comprises a rail supporter to support the guide rail and a curved stand disposed between the rail supporter and the base.

18. The supporting apparatus according to claim 15, further comprising:
a swiveling unit provided between the base and the lifting unit to rotate the display main body around a vertical axis with respect to the base.

19. The supporting apparatus according to claim 15, further comprising:
a tilting unit provided between the display main body and the lifting unit to rotate the display main body around a horizontal axis which is parallel with a planar surface of the display main body.

20. The supporting apparatus according to claim 15, further comprising:
a pivoting unit provided between the display main body and the tilting unit to rotate the display main body around a horizontal axis which is perpendicular to a planar surface of the display main body.

* * * * *